United States Patent
Bai et al.

(10) Patent No.: US 11,886,364 B2
(45) Date of Patent: Jan. 30, 2024

(54) ADAPTIVE HYBRID POLLING BASED ON OUTSTANDING INPUT/OUTPUT (I/O) DETERMINATION

(71) Applicant: VMware, Inc., Palo Alto, CA (US)

(72) Inventors: Yang Bai, Beijing (CN); Wenchao Cui, Beijing (CN); Haitao Guo, Beijing (CN); Ran Peng, Beijing (CN); Tianji Zhao, Beijing (CN)

(73) Assignee: VMware, Inc., Palo Alto, CA (US)

(*) Notice: Subject to any disclaimer, the term of this patent is extended or adjusted under 35 U.S.C. 154(b) by 0 days.

(21) Appl. No.: 17/402,652

(22) Filed: Aug. 16, 2021

(65) Prior Publication Data

US 2022/0414035 A1 Dec. 29, 2022

(30) Foreign Application Priority Data

Jun. 28, 2021 (WO) ................ PCT/CN2021/102737

(51) Int. Cl.
*G06F 13/22* (2006.01)
*G06F 13/24* (2006.01)
(Continued)

(52) U.S. Cl.
CPC ............ *G06F 13/22* (2013.01); *G06F 9/3867* (2013.01); *G06F 9/45558* (2013.01); *G06F 13/24* (2013.01); *G06F 2009/45579* (2013.01)

(58) Field of Classification Search
CPC .... G06F 9/3867; G06F 9/45558; G06F 31/22; G06F 31/24; G06F 2009/45579
See application file for complete search history.

(56) References Cited

U.S. PATENT DOCUMENTS

| 6,065,089 A | * | 5/2000 | Hickerson | ............. | G06F 9/4825 710/48 |
| 10,657,084 B1 | * | 5/2020 | Thyamagondlu | ....... | G06F 13/24 |

(Continued)

OTHER PUBLICATIONS

Koh, S. et al. Faster than flash: An in-depth study of system challenges for emerging ultra-low latency SSDs. Ithaca: Cornell University Library, arXiv.org. Retrieved from https://www.proquest.com/working-papers/faster-than-flash-depth-study-system-challenges/docview/2327671781/se-2 (Year: 2019).*

(Continued)

*Primary Examiner* — Eric T Oberly
(74) *Attorney, Agent, or Firm* — King Intellectual Asset Management (57) ABSTRACT

An adaptive hybrid polling technique combines an interrupt mode with a polling mode, and is based on outstanding input/output (OIO) determination to improve I/O performance and to save processor cycles. The OIO includes two types of I/O commands: (1) I/O commands submitted to storage devices for processing, and (2) I/O commands completed by the storage devices but not yet acknowledged by host software. The adaptive hybrid polling technique involves two phases to determine when to poll based on current OIO commands. In the first phase, a determination is made whether there is an adequate number of the first type of OIO commands to prepare for polling. In the second phase, a determination is made whether there is an adequate number of the second type of OIS commands to activate polling.

21 Claims, 5 Drawing Sheets

(51) Int. Cl.
*G06F 9/38* (2018.01)
*G06F 9/455* (2018.01)

(56) References Cited

U.S. PATENT DOCUMENTS

2019/0317906 A1* 10/2019 Adavi .................... G06F 3/061
2020/0089527 A1* 3/2020 Gavrilov ................ G06F 9/546
2022/0253242 A1* 8/2022 Cresci ................ G06F 12/0246

OTHER PUBLICATIONS

X. Chang, J. K. Muppala, W. Kong, P. Zou, X. Li and Z. Zheng, "A Queue-based Adaptive Polling Scheme to Improve System Performance in Gigabit Ethernet Networks," 2007 IEEE International Performance, Computing, and Communications Conference, 2007, pp. 117-124, doi: 10.1109/PCCC.2007.358886. (Year: 2007).*

* cited by examiner

ADAPTIVE HYBRID POLLING BASED ON OUTSTANDING INPUT/OUTPUT (I/O) DETERMINATION

CROSS-REFERENCE TO RELATED APPLICATION

The present application claims the benefit of Patent Cooperation Treaty (PCT) Application No. PCT/CN2021/102737, filed Jun. 28, 2021. The PCT application is herein incorporated by reference in its entirety.

BACKGROUND

Unless otherwise indicated herein, the approaches described in this section are not admitted to be prior art by inclusion in this section.

Virtualization allows the abstraction and pooling of hardware resources to support virtual machines in a software-defined networking (SDN) environment, such as a software-defined data center (SDDC). For example, through server virtualization, virtualized computing instances such as virtual machines (VMs) running different operating systems (OSs) may be supported by the same physical machine (e.g., referred to as a host). Each virtual machine is generally provisioned with virtual resources to run an operating system and applications. The virtual resources may include central processing unit (CPU) resources, memory resources, storage resources, network resources, etc.

A software-defined approach may be used to create shared storage for VMs, thereby providing a distributed storage system in a virtualized computing environment. Such software-defined approach virtualizes the local physical storage resources of each of the hosts and turns the storage resources into pools of storage that can be divided and assigned to VMs and their applications. The distributed storage system typically involves an arrangement of virtual storage nodes that communicate data with each other and with other devices.

With the development of various storage technologies, such as distributed storage systems in a virtualized computing environment, storage devices are subject to a large number of input/output operations per second (IOPS), including operations to read, write, modify, or otherwise access data to/from the storage devices. The number of such IOPS can range from about one-half million IOPS to ten million or more IOPS for some higher-end storage devices.

Input/output (I/O) commands such as requests to read, write, etc. data are typically coordinated with operations performed by a processor and/or an operating system and applications. For example, a processor may be informed that new data has arrived in a storage device and is available to be read/processed. As another example, the processor may be informed that data has been successfully written to the storage device.

Issuing interrupts is one method to inform the processor about I/O operations that have been completed and/or about other I/O-related activities occurring at the storage devices. However, the processor overhead associated with handling a large number of interrupts, particularly for storage systems with high-rate storage I/O paths, can easily preempt the processor's capability to use its resources for servicing other tasks/applications.

Replacing interrupts with polling is a method to prevent the problematic interrupt storms in a high-traffic situation when there is a large amount of I/O activity at the storage devices. However, continuously polling can consume an entire core of the processor. Moreover, polling is highly inefficient and wasteful of processor cycles when there is little I/O activity at the storage devices that require processing by the processor.

Hybrid polling techniques have been implemented to dynamically switch between an interrupt mode and a polling mode, in an attempt to improve efficiency. For example, hybrid polling techniques use the interrupt mode when there is a relatively low amount of I/O activity and use the polling mode when there is a higher amount of I/O activity.

In order for hybrid polling to work well, there needs to be proper switching between the interrupt mode and the polling mode under different workload conditions and without using manual tuning. However, existing hybrid polling techniques often perform the switching in a deficient and/or ineffective manner.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. The aspects of the present disclosure, as generally described herein, and illustrated in the drawings, can be arranged, substituted, combined, and designed in a wide variety of different configurations, all of which are explicitly contemplated herein.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, such feature, structure, or characteristic may be effected in connection with other embodiments whether or not explicitly described.

The present disclosure addresses the drawbacks associated with existing hybrid polling techniques. Unlike existing hybrid polling techniques (e.g., such as those that operate based on historical workload data), the embodiments disclosed herein provide an adaptive hybrid polling algorithm/ technique for storage devices, which leverages two types of real-time outstanding I/O (OIO) to predict a completion commands rate and improve the accuracy of switching. First, in the switching phase, the adaptive hybrid polling algorithm decides whether to disable an interrupt mode and to start the polling mode, by determining whether there are enough in-flight commands that will return from devices (e.g., the first type of OIO). Second, in the polling phase, the efficiency is improved by adjusting the polling speed dynamically through a count of completion commands from storage devices but not yet acknowledged by a host storage stack (e.g., the second type of OIO).

Computing Environment

In some embodiments, the adaptive hybrid polling technology described herein may be implemented in a distributed storage system provided in a virtualized computing environment, wherein the distributed storage system includes clusters of virtual storage nodes. In other embodiments, the adaptive hybrid polling technology may be implemented in a storage system provided in other types of computing environments (which may not necessarily involve a virtualized computing environment), such as a storage system having clusters of one or more physical storage devices—as one example, the adaptive hybrid polling technology may be implemented in/for a single physical computer that is able to access physical storage device(s). For still other embodiments, the adaptive hybrid polling technology may be implemented for other types of nodes in a computing environment, alternatively or additionally to storage nodes in a distributed storage system, that would benefit from the adaptive hybrid polling techniques described herein. For the sake of illustration and explanation, the various embodiments will be described below in the context of storage nodes in a distributed storage system provided in a virtualized computing environment.

Figure 1:
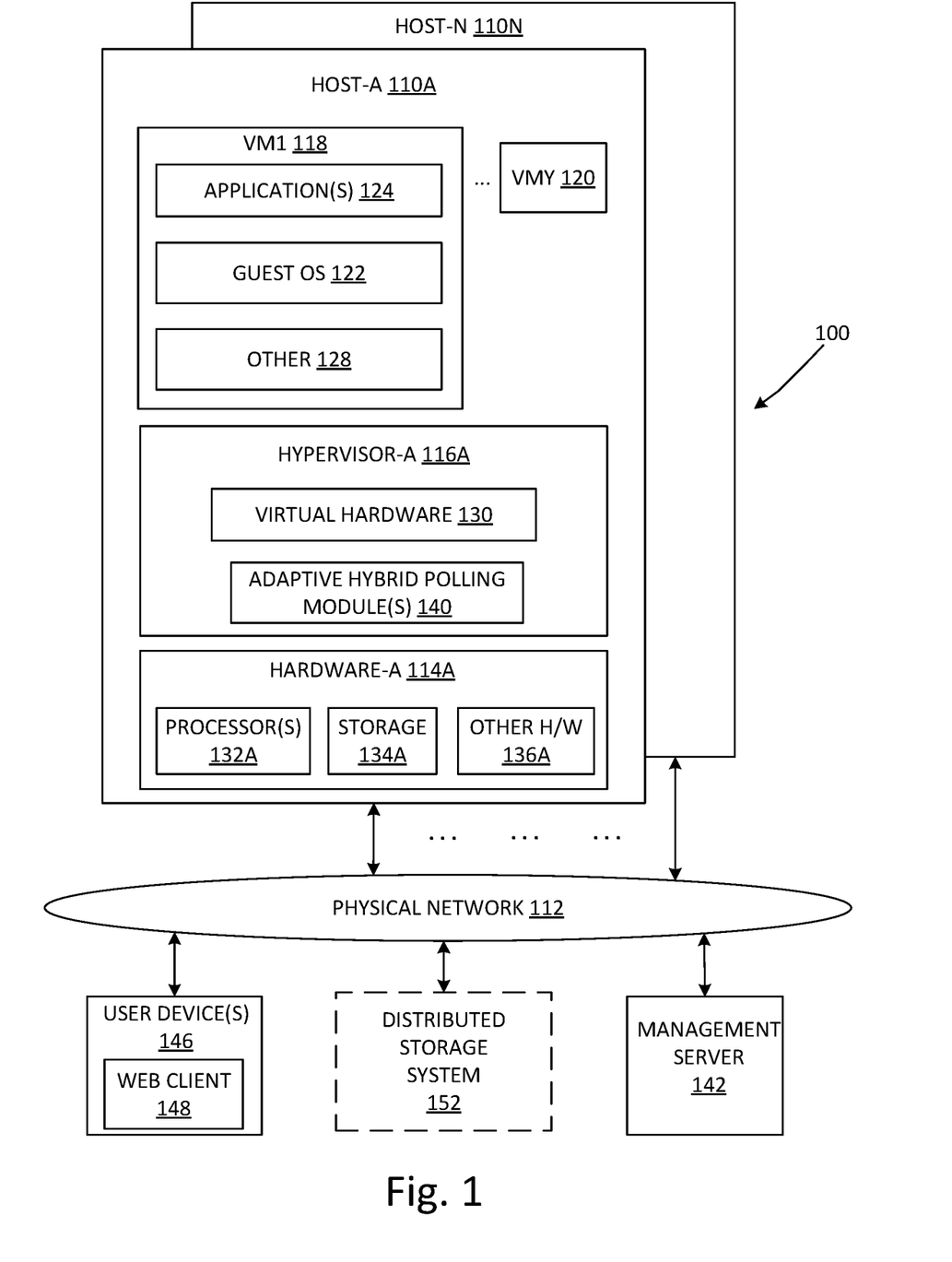
FIG. 1 is a schematic diagram illustrating an example virtualized computing environment that can implement an adaptive hybrid polling method based on outstanding input/output (OIO) determination.

Various implementations will now be explained in more detail using FIG. 1, which is a schematic diagram illustrating an example virtualized computing environment 100 that can provide distributed storage functionality. More specifically, FIG. 1 is a schematic diagram illustrating an example virtualized computing environment 100 that can implement an adaptive hybrid polling method based on outstanding input/output (OIO) determination. Depending on the desired implementation, the virtualized computing environment 100 may include additional and/or alternative components than that shown in FIG. 1.

In the example in FIG. 1, the virtualized computing environment 100 includes multiple hosts, such as host-A 110A . . . host-N 110N that may be inter-connected via a physical network 112, such as represented in FIG. 1 by interconnecting arrows between the physical network 112 and host-A 110A . . . host-N 110N. Examples of the physical network 112 can include a wired network, a wireless network, the Internet, or other network types and also combinations of different networks and network types. For simplicity of explanation, the various components and features of the hosts will be described hereinafter in the context of host-A 110A. Each of the other hosts can include substantially similar elements and features.

The host-A 110A includes suitable hardware-A 114A and virtualization software (e.g., hypervisor-A 116A) to support various virtual machines (VMs). For example, the host-A 110A supports VM1 118 . . . VMY 120, wherein Y (as well as N) is an integer greater than or equal to 1. In practice, the virtualized computing environment 100 may include any number of hosts (also known as a "computing devices", "host computers", "host devices", "physical servers", "server systems", "physical machines," etc.), wherein each host may be supporting tens or hundreds of virtual machines. For the sake of simplicity, the details of only the single VM1 118 is shown and described herein.

VM1 118 may include a guest operating system (OS) 122 and one or more guest applications 124 (and their corresponding processes) that run on top of the guest operating system 122. VM1 118 may include still further other elements, generally depicted at 128, such as a virtual disk, agents, engines, modules, and/or other elements usable in connection with operating VM1 118.

The hypervisor-A 116A may be a software layer or component that supports the execution of multiple virtualized computing instances. The hypervisor-A 116A may run on top of a host operating system (not shown) of the host-A 110A or may run directly on hardware-A 114A. The hypervisor-A 116A maintains a mapping between underlying hardware-A 114A and virtual resources (depicted as virtual hardware 130) allocated to VM1 118 and the other VMs. The hypervisor-A 116A may include one or more adaptive hybrid polling modules 140, which will be described in further detail below with respect to FIGS. 3-5.

The hypervisor-A 116A may include or may operate in cooperation with still further other elements residing at the host-A 110A. Such other elements may include drivers, agent(s), daemons, engines, virtual switches, and other types of modules/units/components that operate to support the functions of the host-A 110A and its VMs.

Hardware-A 114A includes suitable physical components, such as CPU(s) or processor(s) 132A; storage resources(s) 134A; and other hardware 136A such as memory (e.g., random access memory used by the processors 132A), physical network interface controllers (NICs) to provide network connection, storage controller(s) to access the storage resources(s) 134A, etc. Virtual resources (e.g., the virtual hardware 130) are allocated to each virtual machine to support a guest operating system (OS) and application(s) in the virtual machine, such as the guest OS 122 and the applications 124 in VM1 118. Corresponding to the hardware-A 114A, the virtual hardware 130 may include a virtual CPU, a virtual memory, a virtual disk, a virtual network interface controller (VNIC), etc.

Storage resource(s) 134A may be any suitable physical storage device that is locally housed in or directly attached to host-A 110A, such as hard disk drive (HDD), solid-state drive (SSD), solid-state hybrid drive (SSHD), peripheral component interconnect (PCI) based flash storage, serial advanced technology attachment (SATA) storage, serial attached small computer system interface (SAS) storage, integrated drive electronics (IDE) disks, universal serial bus (USB) storage, etc. The corresponding storage controller may be any suitable controller, such as redundant array of independent disks (RAID) controller (e.g., RAID 1 configuration), etc.

A distributed storage system 152 may be connected to each of the host-A 110A . . . host-N 110N that belong to the same cluster of hosts. For example, the physical network 112 may support physical and logical/virtual connections between the host-A 110A . . . host-N 110N, such that their respective local storage resources (such as the storage resource(s) 134A of the host-A 110A and the corresponding storage resource(s) of each of the other hosts) can be aggregated together to form a shared pool of storage in the distributed storage system 152 that is accessible to and shared by each of the host-A 110A . . . host-N 110N, and such that virtual machines supported by these hosts may access the pool of storage to store data. In this manner, the distributed storage system 152 is shown in broken lines in FIG. 1, so as to symbolically convey that the distributed storage system 152 is formed as a virtual/logical arrangement of the physical storage devices (e.g., the storage resource(s) 134A of host-A 110A) located in the host-A 110A . . . host-N 110N. However, in addition to these storage resources, the distributed storage system 152 may also include stand-alone storage devices that may not necessarily be a part of or located in any particular host.

The storage devices in the host-A 110A and/or in the distributed storage system 152 are subject to I/O commands (e.g., read, write, modify, etc.). According to various embodiments that will be described in further detail below with respect to FIGS. 3-5, such I/O activity associated with the storage devices can form a basis for the adaptive hybrid polling techniques that switch between interrupt and polling modes.

A management server 142 or other management entity of one embodiment can take the form of a physical computer with functionality to manage or otherwise control the operation of host-A 110A . . . host-N 110N, including operations associated with the distributed storage system 152. In some embodiments, the functionality of the management server 142 can be implemented in a virtual appliance, for example in the form of a single-purpose VM that may be run on one of the hosts in a cluster or on a host that is not in the cluster of hosts. The management server 142 may be operable to collect usage data associated with the hosts and VMs, to configure and provision VMs, to activate or shut down VMs, to monitor health conditions and diagnose and remedy operational issues that pertain to health, and to perform other managerial tasks associated with the operation and use of the various elements in the virtualized computing environment 100 (including managing the operation of the distributed storage system 152).

The management server 142 may be a physical computer that provides a management console and other tools that are directly or remotely accessible to a system administrator or other user. The management server 142 may be communicatively coupled to host-A 110A . . . host-N 110N (and hence communicatively coupled to the virtual machines, hypervisors, hardware, distributed storage system 152, etc.) via the physical network 112. The host-A 110A . . . host-N 110N may in turn be configured as a datacenter that is also managed by the management server 142. In some embodiments, the functionality of the management server 142 may be implemented in any of host-A 110A . . . host-N 110N, instead of being provided as a separate standalone device such as depicted in FIG. 1.

A user may operate a user device 146 to access, via the physical network 112, the functionality of VM1 118 . . . VMY 120 (including operating the applications 124), using a web client 148. The user device 146 can be in the form of a computer, including desktop computers and portable computers (such as laptops and smart phones). In one embodiment, the user may be a system administrator that uses the web client 148 of the user device 146 to remotely communicate with the management server 142 via a management console for purposes of performing management operations. The user may also be any general user, such as a consumer that is using the services (e.g., the application 124) provided by VM1 118 and/or using the distributed storage system 152.

Depending on various implementations, one or more of the physical network 112, the management server 142, and the user device(s) 146 can comprise parts of the virtualized computing environment 100, or one or more of these elements can be external to the virtualized computing environment 100 and configured to be communicatively coupled to the virtualized computing environment 100.

Classic Hybrid Polling Techniques

Some existing hybrid polling techniques use fixed intervals to switch between an interrupt mode and a polling mode. While such techniques may work well for some particular use cases, such techniques are not well-suited for many other use cases and workload situations.

Some other switching techniques involve interrupt coalescing or are interrupt rate driven. These techniques rely on historical data, such as historical packet receiving status, to predict a future packet receiving rate and then produce tuned interrupt rates, but such techniques/predictions may not always be accurate. As an example, FIG. 2 is a timing diagram 200 illustrating a hybrid polling method that is based at least in part on historical data.

Figure 2:
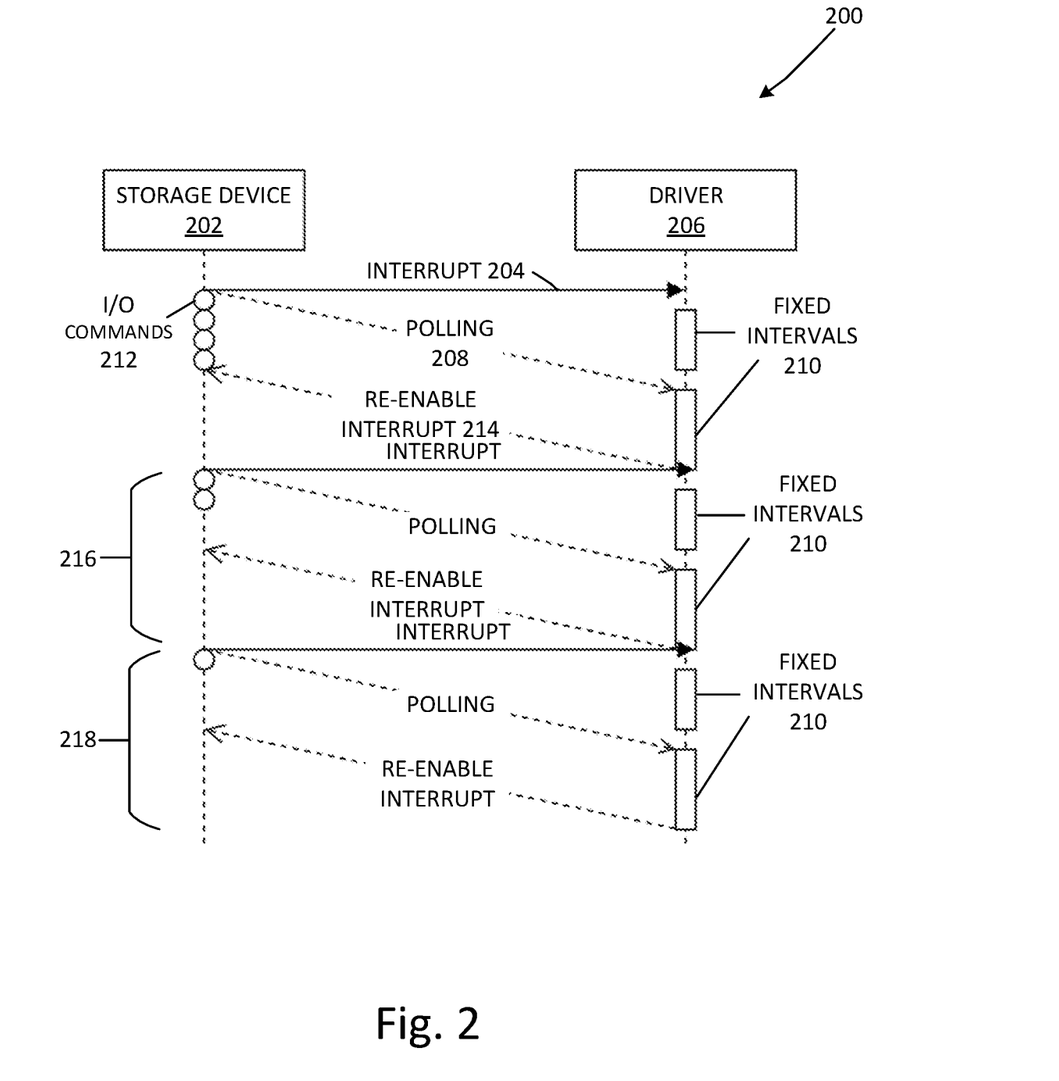
FIG. 2 is a timing diagram illustrating a hybrid polling method.

As depicted in FIG. 2, a classic hybrid polling method relies on interrupts to trigger a switch from an interrupt mode to a polling mode. For instance, when a packet is received at a storage device 202, the storage device 202 sends an interrupt 204 to a storage driver 206.

The storage driver 206 will then disable the interrupt mode after the first packet arrives and enter a polling mode so as start to poll (shown at 208) for new packets in a certain time interval 210. I/O commands 212 (depicted as circles in FIG. 2) are completed by the storage device 202 and are detected/processed by the storage driver 206 during the polling interval(s). Thus, this polling mode can avoid potentially thousands of interrupts and improve the efficiency of processor, due to the processor not having to process the interrupts. At the end of the polling interval(s), the storage driver 206 re-enables (shown at 214) the interrupt mode, to thereby switch from the polling mode back to the interrupt mode.

However, the hybrid polling method shown in FIG. 2 increases the I/O latency or wastes processor cycles due to the time interval between the transition from the interrupt mode to the polling mode and/or due to empty polling (e.g., polling when there is little or no I/O activity at the storage device 202), which are undesirable results. For example, the hybrid polling method of FIG. 2 assumes that the upcoming rate of completion commands will tend to keep the same pace with the interrupt rate. That assumption may not always be accurate because the assumption predicts stochastic future data based on historical data. As depicted by way of example in FIG. 2, the rate of subsequent completed I/O commands (shown as two circles at 216 and one circle at 218) is significantly less than the previous rate (shown as four circles).

Furthermore and also as shown in FIG. 2, polling is not optimum for all system workloads. At 216 and 218, interrupts have triggered the storage driver 206 to switch to the polling mode, but processor cycles are wasted to poll at 216 and 218 when there is a less intensive workload at the storage device 202. Moreover, even if the time intervals 210 are adjusted, it is still difficult to avoid the increase in I/O latency that results from transitioning from the interrupt mode to the polling mode.

Adaptive Hybrid Polling Techniques Based on OIO Determination

One basis for the adaptive hybrid polling techniques described herein is that interrupts should not be entirely replaced by polling. Indeed and as described above with respect to FIG. 2, polling has certain disadvantages under certain workload scenarios. The embodiments of the adaptive hybrid polling techniques described herein implement interrupts when appropriate and implement polling at other times when appropriate, with the recognition that hybrid polling involves a tradeoff between I/O performance and CPU cost. The polling mode should also avoid being a noisy neighbor, which may affect the performance of other components.

Rather than basing the switching on historical data such as described above with reference to FIG. 2, the embodiments of the adaptive hybrid polling techniques recognize that the number of I/O commands submitted to the storage devices determines the number of completion commands received on the storage path from the storage devices. Thus, the adaptive hybrid polling algorithm/technique can determine how many interrupts will be (would have been) issued based on counting the submitted I/O commands instead of basing on historical data. In view of this recognition, various embodiments of the adaptive hybrid polling technique for storage device may be based on two types of outstanding input/output (OIO) determination.

Outstanding I/O (OIO) according to various embodiments described herein includes two types of I/O commands. The first type of OIO commands are I/O commands that have been submitted to the storage devices and are being processed (or queued up to be processed) by the storage devices. The second type of OIO commands are I/O commands that have been completed by the storage devices but not yet acknowledged by software at the host—an example of the second type of OIO command is a completion command that has been placed by the storage device in a completion queue.

The adaptive hybrid polling technique includes two phases that are based on OIO determinations. The first phase is a switching phase that involves switching from the interrupt mode to preparing for the polling mode, based on the first type of OIO command. The second phase involves proceeding with the polling mode if there is truly an adequate number of I/O for the host software to process that will justify operation in the polling mode—such determination made for the second phase is based on the second type of OIO command.

There are several reasons why embodiments of the adaptive hybrid polling technique perform the foregoing determinations two phases. First, more accuracy is provided by using OIO to determine when to poll—whichever of the first or second types of OIO command (or both) are being used for determination of whether to switch between interrupt and polling modes for a particular phase, some interrupts during this phase should still be handled (e.g., so as to avoid I/O latency). Next, keeping in mind a goal to minimize/reduce the interrupt rate, checking the number of OIO commands (which is the best metric to determine how many I/O commands are to be processed) enables a first determination of whether to disable the interrupt mode, and then with the interrupt mode disabled, checking whether there a sufficient number of I/O commands (e.g., completion commands) for the host software to process enables a second determination to proceed with the polling mode—in this manner, the interrupt rate may be reduced as much as possible.

Figure 3:
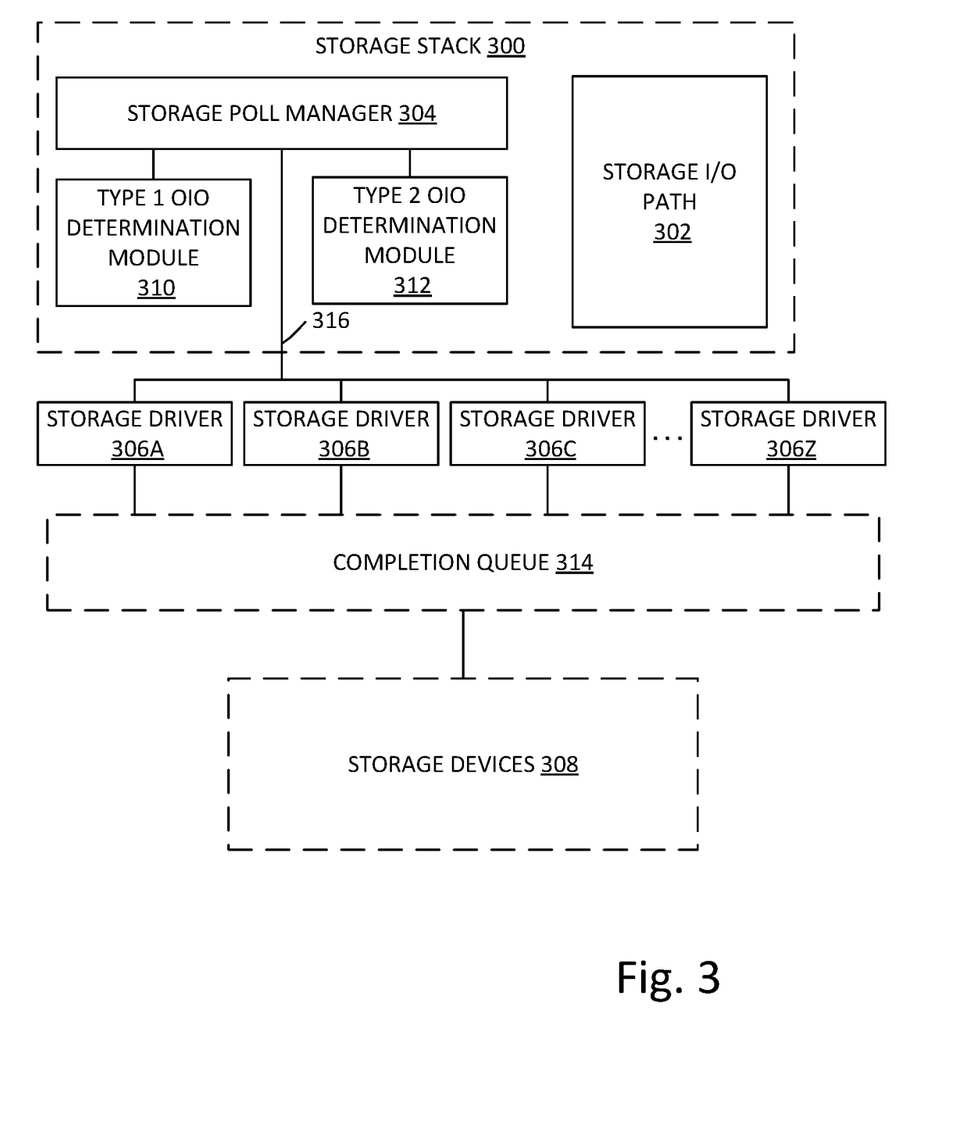
FIG. 3 is a schematic diagram showing further details of various components in the virtualized computing environment of FIG. 1 that can cooperate to perform an adaptive hybrid polling method.

The above-described phases of the adaptive hybrid polling technique, based on the first and second types of OIO determination, may be performed using at least some of the components shown in FIG. 3, which are represented at least in part by the adaptive hybrid polling module(s) 140 in FIG. 1. More specifically, FIG. 3 is a schematic diagram showing further details of various components in the virtualized computing environment 100 of FIG. 1 that can cooperate to perform an adaptive hybrid polling method.

In FIG. 3, a storage stack 300 may reside in the kernel space of the hypervisor-A 116A. The storage stack 300 includes various modules that run in the kernel space, including a storage I/O path 302 and a storage poll manager 304.

According to various embodiments, the storage poll manager 304 provides application program interfaces (APIs) for polling and performs other operations, as well as interfacing/communicating with storage drivers 306A . . . 306Z (collectively referred to as storage driver(s) 306). The storage drivers 306 in turn operate/communicate with and in conjunction with storage devices 308 (e.g., located in the host and/or elsewhere in the distributed storage system 152 of FIG. 1).

The storage poll manager 304 may be configured to perform the first and second phases of the adaptive hybrid polling algorithm (including controlling the switching between interrupt and polling modes), and may in turn include or may be in communication with a first determination module 310 and a second determination module 312. The first determination module 310 may be configured, for example, to determine a number of the first type of OIO commands that have been submitted for processing by the storage devices 308. The first determination module 310 is able to determine this number of the first type of OIO commands, for example, since the hypervisor-A 116A and/or host OS has knowledge (monitors) the communications/commands sent to/from the storage devices 308.

The second determination module 312 may be configured, for example, to determine a number of the second type of OIO commands. For example, when the storage device 308 completes an I/O command, the storage device 308 may send a completion command to a completion queue 314. The storage poll manager 304 (second determination module 312) may then communicate with the storage drivers 306 (as depicted at 316 in FIG. 3), and the storage drivers 306 are in turn able to check the completion queue 314 to count and report the number of completion commands in the completion queue 314 that have not yet been acknowledged by the host software. In other embodiments, the storage poll manager 304 (second determination module 312) may be able to check the completion queue 314 directly, without going through the storage drivers 306.

With respect to interrupts, the storage devices 308 may issue interrupts that are received by the storage I/O path 302 and/or by the storage poll manager 304 for processing by a host processor (e.g., processor 132A in FIG. 1). Such interrupts may be sent by the storage devices 314 directly to an interrupt handler (not shown) for subsequent processing by the processor, or may be indirectly sent to the interrupt handler via the completion queue 314 and the storage driver 306.

It is understood that arrangements/processes other than those described above with respect to FIG. 3 are possible. For example, polling modules may be implemented in one or more of the storage drivers 306 or in one of the components in the kernel space. As another example, one or more of the storage poll manager 304, the first determination module 310, and the second determination module 312 may reside outside of the hypervisor-A 116A or kernel space. Still further, other types of components, paths, etc. may be used to send and process interrupts, to send and receive/process I/O commands (including completion commands), to detect and count the first and second types of OIO commands, etc.

Figure 4:
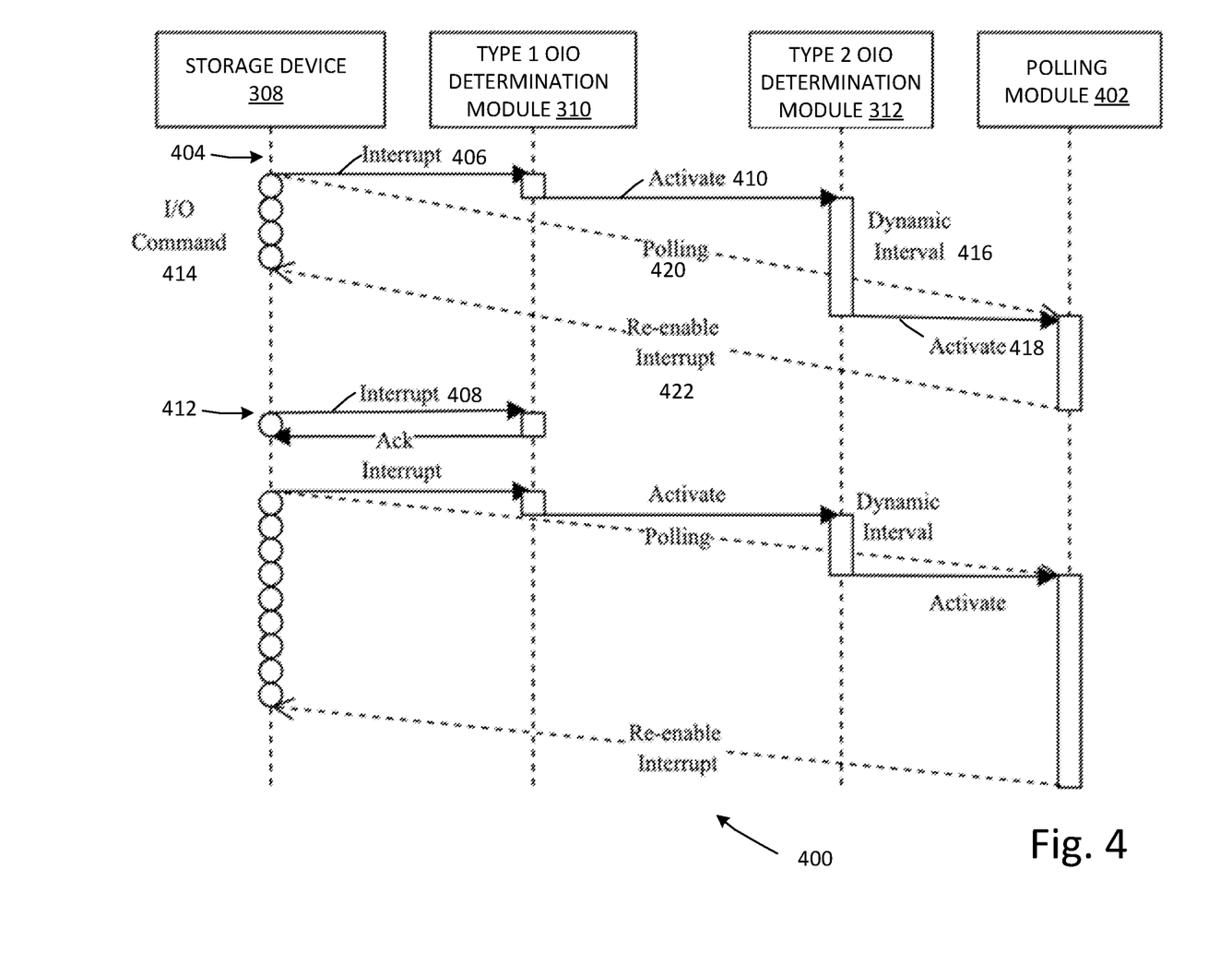
FIG. 4 is a timing diagram illustrating an adaptive hybrid polling method performed by the components shown in FIG. 3.

The components shown and described above with respect to FIG. 3 can be viewed next in conjunction with FIG. 4, which is a timing diagram 400 illustrating an adaptive hybrid polling method (including its two phases) performed by the components shown in FIG. 3. Such components (which are now also depicted in FIG. 4) include the storage device(s) 308, the first determination module 310, the second determination module 312, and a polling module 402 (which may reside in the storage drivers 306 or elsewhere) to perform polls during the polling mode.

The first phase may correspond to a function referred to as 'IntrHandler( )', and the second phase may correspond to a function referred to as 'pollHandler( )'.

For the 'IntrHandler( )' function in the first phase of the adaptive hybrid polling technique:
A. In the beginning at 404, the interrupt handler works in the interrupt mode.
B. Later (such as when an interrupt 406 or 408 is received), in one interrupt handle routine, the first determination module 310 will check if the number of the first type of OIO command exceeds 'pollThr'. 'pollThr' may be a threshold value that determines whether to remain in the interrupt mode or to switch to preparing for the polling mode. 'pollThr' may have a value, for example, of 30 of the first type of OIO commands, and it is understood that this value and other values provided herewith are merely for illustrative purposes.
 1) If the first determination module 310 determines that 'pollThr' is exceeded, then the first determination module 310 will disable the interrupt mode and then activate (shown at 410) the second determination module 312. However, polling does not yet immediately begin at this point in time.
 2) However, if the first determination module 310 determines that 'pollThr' is not exceeded, then the interrupt (e.g., the interrupt 408) and its corresponding arrived I/O command in the completion queue 314 are processed (represented at 412) by the interrupt handler and host processor.

For the 'pollHandler( )' function in the second phase of the adaptive hybrid polling technique:
A. After being activated, the second determination module 312 will first check if the number of the second type of OIO commands (e.g., by checking the completion queue 314) exceeds 'minCompletedCmdsNum'. For instance, 'minCompletedCmdsNum' may represent a minimum number of completion commands 414 received in the completion queue 314, and this number dictates whether to begin polling and processing the received I/O commands. 'minCompletedCmdsNum' may have a value, for example, of 10 completion commands.
 1) If the second determination module 312 determines (during an interval 416) that 'minCompletedCmdsNum' is exceeded, then the second determination module 312 activates (shown at 418) the polling module 402, and the polling module 402 will process the arrived I/O commands.
 2) However, if the second determination module 312 determines (during the interval 416) that 'minCompletedCmdsNum' is not exceeded, then the second determination module 312 will wait/sleep for a period of time (e.g., an 'interval' time of 10 microseconds) before checking the value of 'minCompletedCmdsNum' again. A number of times that the second determination module 312 will iterate through this checking and then waiting/sleeping cannot exceed a value of 'maxTryPollNum' (which may be set at 3), so as to avoid unduly delaying the processing of completed commands in the completion queue 414 that do not meet the threshold number of 'minCompletedCmdsNum' to trigger activation of the polling module 402. When 'maxTryPollNum' is reached or exceeded, the completion commands in the completion queue 314 are processed.
B. After the polling module 402 processes the received I/O commands as described above in A1) and A2), the polling module 402 will check if the number of processed IOs is not less than a value of 'budget' (which may be set at 10),
 1) If determined to not be less than the value of 'budget', then this condition indicates that there is sufficient I/O activity to justify continued polling. The 'pollHandler( )' function returns a value of 'TRUE' so as to keep polling (shown at 420) with the polling module 402 and processing the received I/O commands.
 2) If determined to be less than the value of 'budget', then this condition indicates that there is insufficient I/O activity to justify continued polling. The 'pollHandler( )' function returns a value of 'FALSE' so as to inactivate polling the polling mode and to re-enable (shown at 422) the interrupt mode.

Figure 5:
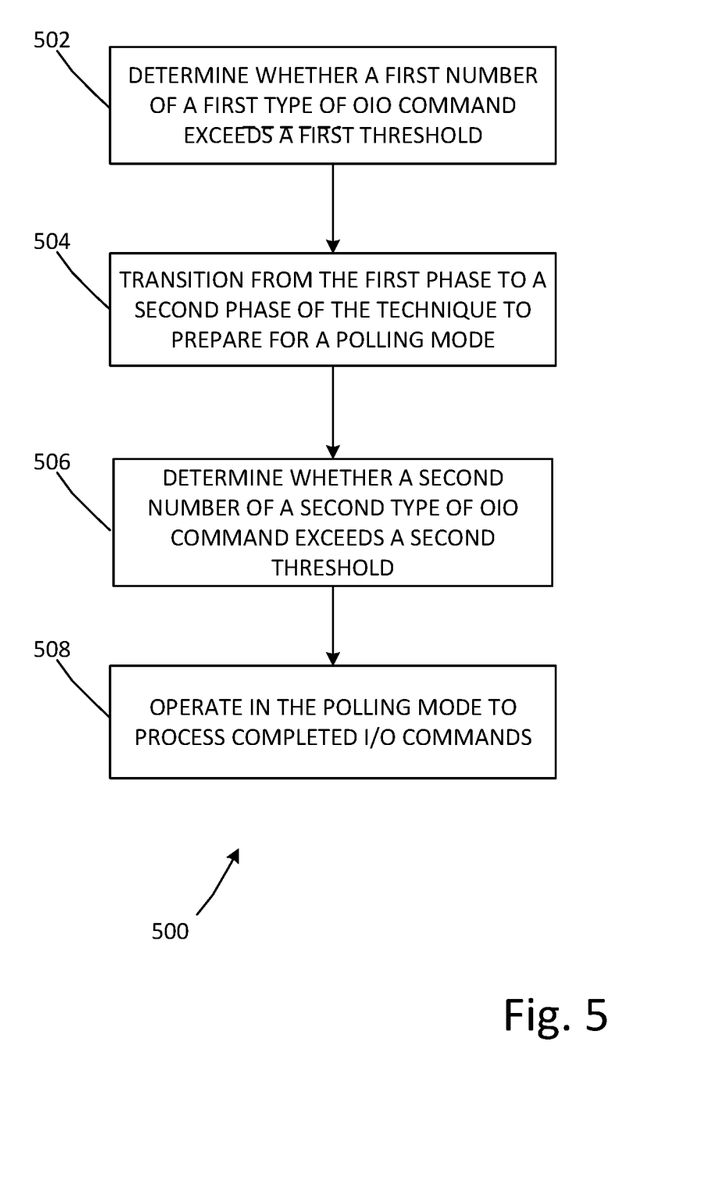
FIG. 5 is a flowchart of an example adaptive hybrid polling method that may be performed in the virtualized computing environment of FIG. 1.

FIG. 5 is a flowchart of an adaptive hybrid polling method 500 that may be performed in the virtualized computing environment 100 of FIG. 1. More specifically, a host (e.g., the host-A 110 and its hypervisor-A 116A and/or other components residing in the host-A 110A) may perform the method 500 as an adaptive hybrid polling technique based on outstanding input/output (OIO) determination. The example method 500 may include one or more operations, functions, or actions illustrated by one or more blocks, such as blocks 502 to 508. The various blocks of the method 500 and/or of any other process(es) described herein may be combined into fewer blocks, divided into additional blocks, supplemented with further blocks, and/or eliminated based upon the desired implementation. In one embodiment, the operations of the method 500 and/or of any other process(es) described herein may be performed in a pipelined sequential manner. In other embodiments, some operations may be performed out-of-order, in parallel, etc.

The method 500 may begin at a block 502 ("DETERMINE WHETHER A FIRST NUMBER OF A FIRST TYPE OF OIO COMMAND EXCEEDS A FIRST THRESHOLD"), wherein during the first phase of the adaptive hybrid polling technique, the host is an interrupt mode, and the first determination module 310 determines whether a first number of the first type of OIO command exceeds a first threshold 'pollThr'.

The block 502 may be followed by a block 504 ("TRANSITION FROM THE FIRST PHASE TO A SECOND PHASE OF THE TECHNIQUE TO PREPARE FOR A POLLING MODE"), wherein in response to a determination that the first threshold has been exceeded, the adaptive hybrid polling technique transitions from the first phase to the second phase. As previously described above, this transition may involve the first determination module 310 activating the second determination module 312. During this transition, such as at interval 416 shown in FIG. 4, the host can continue to process received/completed I/O commands, such as those present in the completion queue 314.

However, if it is determined that the first threshold is not exceeded at the block 504, then the host remains in the interrupt mode.

The block 504 may be followed by a block 506 ("DETERMINE WHETHER A SECOND NUMBER OF A SECOND TYPE OF OIO COMMAND EXCEEDS A SECOND THRESHOLD"), wherein during the second phase of the adaptive hybrid polling technique, the second determination module 312 determines whether a second number of the second type of OIO commands exceeds a second threshold 'minCompletedCmdsNum'. This determination may be performed, for example, by checking the completion queue 314 to count the number of completion commands contained therein.

The block 506 may be followed by a block 508 ("OPERATE IN THE POLLING MODE TO PROCESS COMPLETED I/O COMMANDS"), wherein during the second phase of the adaptive hybrid polling technique and in response to determination by the second determination module 312 that the second number exceeds the second threshold, the second determination module 312 activates the polling module 402 to operate in the polling mode to process the completion commands in the completion queue.

Computing Device

The above examples can be implemented by hardware (including hardware logic circuitry), software or firmware or a combination thereof. The above examples may be implemented by any suitable computing device, computer system, etc. The computing device may include processor(s), memory unit(s) and physical NIC(s) that may communicate with each other via a communication bus, etc. The computing device may include a non-transitory computer-readable medium having stored thereon instructions or program code that, in response to execution by the processor, cause the processor to perform processes described herein with reference to FIG. 1 and FIG. 3 to FIG. 5.

The techniques introduced above can be implemented in special-purpose hardwired circuitry, in software and/or firmware in conjunction with programmable circuitry, or in a combination thereof. Special-purpose hardwired circuitry may be in the form of, for example, one or more application-specific integrated circuits (ASICs), programmable logic devices (PLDs), field-programmable gate arrays (FPGAs), and others. The term "processor" is to be interpreted broadly to include a processing unit, ASIC, logic unit, or programmable gate array etc.

Although examples of the present disclosure refer to "virtual machines," it should be understood that a virtual machine running within a host is merely one example of a "virtualized computing instance" or "workload." A virtualized computing instance may represent an addressable data compute node or isolated user space instance. In practice, any suitable technology may be used to provide isolated user space instances, not just hardware virtualization. Other virtualized computing instances may include containers (e.g., running on top of a host operating system without the need for a hypervisor or separate operating system; or implemented as an operating system level virtualization), virtual private servers, client computers, etc. The virtual machines may also be complete computation environments, containing virtual equivalents of the hardware and system software components of a physical computing system. Moreover, some embodiments may be implemented in other types of computing environments (which may not necessarily involve a virtualized computing environment and/or storage nodes in distributed storage system), wherein it would be beneficial to provide an adaptive hybrid polling technique that is based on OIO determination.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood that each function and/or operation within such block diagrams, flowcharts, or examples can be implemented, individually and/or collectively, by a wide range of hardware, software, firmware, or any combination thereof.

Some aspects of the embodiments disclosed herein, in whole or in part, can be equivalently implemented in integrated circuits, as one or more computer programs running on one or more computers (e.g., as one or more programs running on one or more computing systems), as one or more programs running on one or more processors (e.g., as one or more programs running on one or more microprocessors), as firmware, or as virtually any combination thereof, and that designing the circuitry and/or writing the code for the software and or firmware are possible in light of this disclosure.

Software and/or other computer-readable instruction to implement the techniques introduced here may be stored on a non-transitory computer-readable storage medium and may be executed by one or more general-purpose or special-purpose programmable microprocessors. A "computer-readable storage medium", as the term is used herein, includes any mechanism that provides (i.e., stores and/or transmits) information in a form accessible by a machine (e.g., a computer, network device, personal digital assistant (PDA), mobile device, manufacturing tool, any device with a set of one or more processors, etc.). A computer-readable storage medium may include recordable/non-recordable media (e.g., read-only memory (ROM), random access memory (RAM), magnetic disk or optical storage media, flash memory devices, etc.).

The drawings are only illustrations of an example, wherein the units or procedure shown in the drawings are not necessarily essential for implementing the present disclosure. The units in the device in the examples can be arranged in the device in the examples as described, or can be alternatively located in one or more devices different from that in the examples. The units in the examples described can be combined into one module or further divided into a plurality of sub-units.

We claim:

1. A method for a host to perform an adaptive hybrid polling technique based on outstanding input/output (OIO) determination, the method comprising:
   during a first phase of the technique, determining, by a first determination module of the host, whether a first number of a first type of OIO command exceeds a first threshold while operating in an interrupt mode;
   in response to determination that the first number exceeds the first threshold, transitioning, by the first determination module, from the first phase to a second phase of the technique to prepare for a polling mode by disabling the interrupt mode and activating a second determination module of the host; else remaining in an interrupt mode;
   during the second phase of the technique, determining, by the second determination module, whether a second number of a second type of OIO command exceeds a second threshold; and
   in response to determination that the second number exceeds the second threshold, operating in the polling mode to process completed I/O commands.

2. The method of claim 1, wherein the first type of OIO command includes I/O commands that have been submitted to storage devices, and wherein the second type of I/O command includes completion commands that indicate that the submitted I/O commands have been completed by the storage devices but not yet acknowledged by the host.

3. The method of claim 2, wherein determining whether the second number exceeds the second threshold includes checking a completion queue to count the completion commands in the completion queue.

4. The method of claim 1, further comprising in response to determination that the second number is less than the second threshold:
waiting for an interval of time;
after the interval of time, further determining whether the second number of the second type of OIO command exceeds the second threshold; and
in response to the further determining being indicative that the second number is still less than the second threshold, waiting again for another interval of time; else operating in the polling mode to process completed I/O commands corresponding to the second type of OIO command,
wherein a number of iterations into waiting for the interval of time is set to be less than a maximum value.

5. The method of claim 1, further comprising after processing the completed I/O commands:
determining whether the number of processed I/O commands is less than a budget value;
in response to determination that the number of processed I/O commands is greater than the budget value, continuing to operate in the polling mode; and
in response to determination that the number of processed I/O commands is less than the budget value, disabling the polling mode and re-enabling the interrupt mode.

6. The method of claim 1, further comprising:
during the transitioning from the first phase to the second phase of the technique, continuing to process completed I/O commands.

7. The method of claim 1, wherein the host comprises part of a virtualized computing environment, and wherein the first and second types of OIO commands correspond to I/O operations performed on a distributed storage system in the virtualized computing environment.

8. A non-transitory computer-readable medium having instructions stored thereon, which in response to execution by one or more processors, cause the one or more processors of a host to perform or control performance of a method for an adaptive hybrid polling technique based on outstanding input/output (OIO) determination, wherein the method comprises:
during a first phase of the technique, determining, by a first determination module of the host, whether a first number of a first type of OIO command exceeds a first threshold while operating in an interrupt mode;
in response to determination that the first number exceeds the first threshold, transitioning, by the first determination module, from the first phase to a second phase of the technique to prepare for a polling mode by disabling the interrupt mode and activating a second determination module of the host; else remaining in an interrupt mode;
during the second phase of the technique, determining, by the second determination module, whether a second number of a second type of OIO command exceeds a second threshold; and
in response to determination that the second number exceeds the second threshold, operating in the polling mode to process completed I/O commands.

9. The non-transitory computer-readable medium of claim 8, wherein the first type of OIO command includes I/O commands that have been submitted to storage devices, and wherein the second type of I/O command includes completion commands that indicate that the submitted I/O commands have been completed by the storage devices but not yet acknowledged by the host.

10. The non-transitory computer-readable medium of claim 9, wherein determining whether the second number exceeds the second threshold includes checking a completion queue to count the completion commands in the completion queue.

11. The non-transitory computer-readable medium of claim 8, wherein the method further comprises in response to determination that the second number is less than the second threshold:
waiting for an interval of time;
after the interval of time, further determining whether the second number of the second type of OIO command exceeds the second threshold; and
in response to the further determining being indicative that the second number is still less than the second threshold, waiting again for another interval of time; else operating in the polling mode to process completed I/O commands corresponding to the second type of OIO command,
wherein a number of iterations into waiting for the interval of time is set to be less than a maximum value.

12. The non-transitory computer-readable medium of claim 8, wherein the method further comprises after processing the completed I/O commands:
determining whether the number of processed I/O commands is less than a budget value;
in response to determination that the number of processed I/O commands is greater than the budget value, continuing to operate in the polling mode; and
in response to determination that the number of processed I/O commands is less than the budget value, disabling the polling mode and re-enabling the interrupt mode.

13. The non-transitory computer-readable medium of claim 8, wherein the method further comprises:
during the transitioning from the first phase to the second phase of the technique, continuing to process completed I/O commands.

14. The non-transitory computer-readable medium of claim 8, wherein the host comprises part of a virtualized computing environment, and wherein the first and second types of OIO commands correspond to I/O operations performed on a distributed storage system in the virtualized computing environment.

15. A host to perform an adaptive hybrid polling technique based on outstanding input/output (OIO) determination, the host comprising:
one or more processors; and
a non-transitory computer-readable medium coupled to the one or more processors, and having instructions stored thereon, which in response to execution by the one or more processors, cause the one or more processors to perform or control performance of operations that include:
during a first phase of the technique, determine, by a first determination module of the host, whether a first number of a first type of OIO command exceeds a first threshold while operating in an interrupt mode;
in response to determination that the first number exceeds the first threshold, transition, by the first determination module, from the first phase to a second phase of the technique to prepare for a polling mode by disabling the interrupt mode and activating a second determination module of the host; else remain in an interrupt mode;

during the second phase of the technique, determine, by the second determination module, whether a second number of a second type of OIO command exceeds a second threshold; and in response to determination that the second number exceeds the second threshold, operate in the polling mode to process completed I/O commands.

16. The host of claim 15, wherein the first type of OIO command includes I/O commands that have been submitted to storage devices, and wherein the second type of I/O command includes completion commands that indicate that the submitted I/O commands have been completed by the storage devices but not yet acknowledged by the host.

17. The host of claim 16, wherein the operation to determine whether the second number exceeds the second threshold includes an operation to check a completion queue to count the completion commands in the completion queue.

18. The host of claim 15, wherein the operations further comprise in response to determination that the second number is less than the second threshold:

wait for an interval of time;

after the interval of time, further determine whether the second number of the second type of OIO command exceeds the second threshold; and in response to the further determination being indicative that the second number is still less than the second threshold, wait again for another interval of time; else operate in the polling mode to process completed I/O commands corresponding to the second type of OIO command, wherein a number of iterations into waiting for the interval of time is set to be less than a maximum value.

19. The host of claim 15, wherein to the operations further comprise after processing the completed I/O commands:

determine whether the number of processed I/O commands is less than a budget value;

in response to determination that the number of processed I/O commands is greater than the budget value, continue to operate in the polling mode; and in response to determination that the number of processed I/O commands is less than the budget value, disable the polling mode and re-enable the interrupt mode.

20. The host of claim 15, wherein the operations further comprise:

during the transition from the first phase to the second phase of the technique, continue to process completed I/O commands.

21. The host of claim 15, wherein the host comprises part of a virtualized computing environment, and wherein the first and second types of OIO commands correspond to I/O operations performed on a distributed storage system in the virtualized computing environment.

* * * * *